ical, indexible cutting insert is

United States Patent [19]
Stambler

[11] 3,885,281
[45] May 27, 1975

[54] CUTTING INSERT WITH CHIP CONTROL
[75] Inventor: Abraham M. Stambler, Haifa, Israel
[73] Assignee: Iscar Ltd., Nahariya, Israel
[22] Filed: June 10, 1974
[21] Appl. No.: 478,031

[52] U.S. Cl. ................................ 29/95 R; 29/96
[51] Int. Cl. ........................................ B26d 1/00
[58] Field of Search ........................ 29/95 R, 96

[56] References Cited
UNITED STATES PATENTS
3,395,434  8/1968  Wirfelt ............................ 29/95 R
3,815,191  6/1974  Holma ............................ 29/95 R Primary Examiner—Leonidas Vlachos
Attorney, Agent, or Firm—J. B. Felshin; Marvin Feldman

[57] ABSTRACT
This disposable polygonal, indexible cutting insert is provided with longitudinally curved channels, along the side edges of the insert, meeting at the corners of the insert. These channels are also transversely curved. At each corner of the insert, V-shaped shallow grooves are depressed into the joining or merging portions of the deeper longitudinal channels. With this construction the shallow, corner V-grooves provide good chip control for shallow depth cuts of the cutting tool and for fine longitudinal feed of the cutting tool relative to the work piece, per revolution of the rotating work piece, whereas the longitudinally curved deeper channels alongside the edges of the insert provide for good chip control for greater depth cuts and for greater longitudinal feed of the tool relative to the work piece, per revolution of the work piece. When profiling, both the shallow corner V grooves and the deeper longitudinal side channels, automatically provide good chip control as the depth of the cut increases and decreases during the profiling operation.

8 Claims, 5 Drawing Figures

CUTTING INSERT WITH CHIP CONTROL

This invention relates to disposable cutting inserts with chip control.

An object of this invention is to provide a cutting insert of the character described having means to attain good chip control when making shallow depth cuts and fine longitudinal feed of the cutting tool per revolution of the work piece, and also good chip control when making increased depth cuts and increased longitudinal feed of the cutting tool relative to the work piece per revolution of the rotating work piece.

Another object of this invention is to provide a cutting insert of the character described which, when profiling a work piece on a lathe, allows the portions of the insert adjacent the shallow V-shaped groove alone to cut the work piece while the depth of cuts are shallow, and allows portions of insert adjacent the deeper longitudinally curved side channels beyond the shallow grooves, to cut the work piece for deeper cuts of the work piece, during the profiling operation.

Yet another object of this invention is to provide a cutting insert of the character described, of polygonal shape having longitudinal channels alongside the side edges of the insert, and V-shaped grooves depressed into the meeting corner ends of said side channels.

Still another object of this invention is to provide an insert of the character described in which the side channels are deeper than the V-shaped corner depressed grooves.

A further object of this invention is to provide a polygonal cutting insert of the character described having a longitudinal side channel alongside a side edge of a face of said insert and a corner groove depressed into an end of said side channel.

Yet a further object of this invention is to provide an insert of the character described in which said corner groove is narrower and of less depth than said longitudinal side channel.

Still a further object of this invention is to provide an insert of the character described in which there are corner grooves depressed into both ends of said side channel, terminating short of each other.

Yet another object of this invention is to provide a strong and durable disposable, indexible cutting insert of the character described which shall be relatively inexpensive to manufacture and yet practical and efficient to a high degree in use.

Other objects of this invention will in part be obvious and in part hereinafter pointed out.

The invention accordingly consists in the features of construction, combinations of elements, and arrangement of parts which will be exemplified in the construction hereinafter described and of which the scope of invention will be indicated in the following claims.

Figure 1:
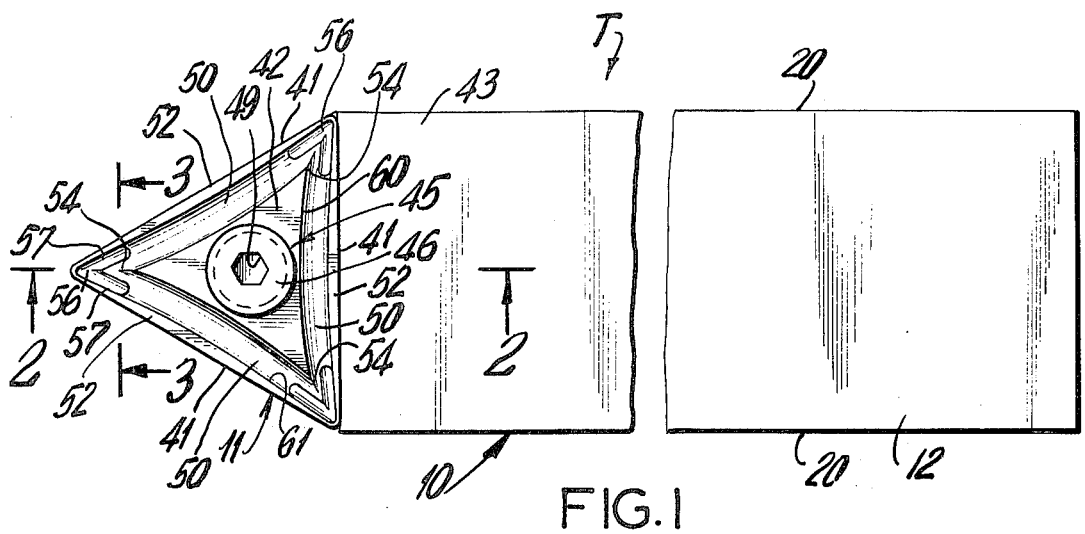
FIG. 1 is a top plan view of a tool comprising a tool body on which a cutting insert embodying the invention, is mounted.
Figure 2:
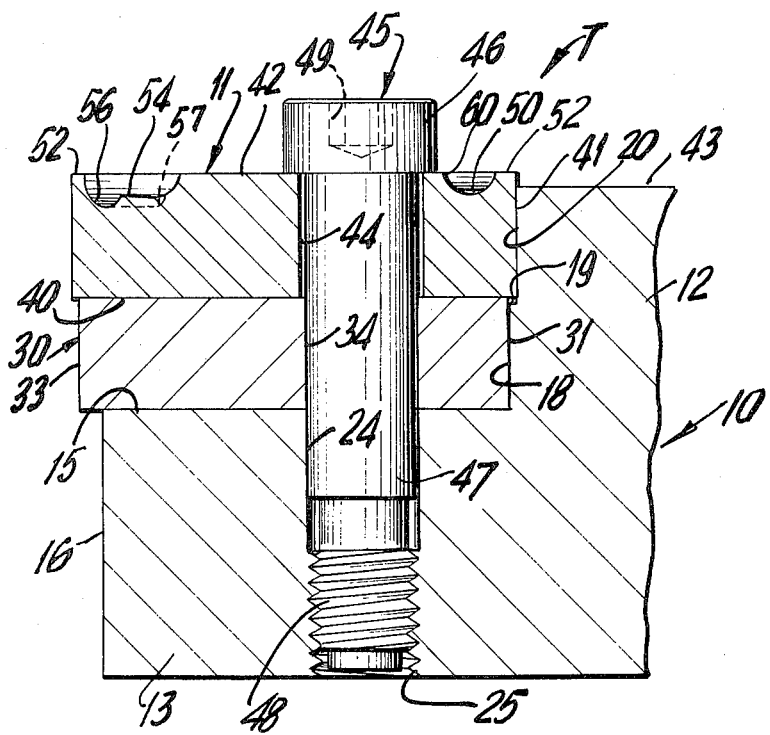
FIG. 2 is an enlarged cross-sectional view taken on line 2—2 of FIG. 1.
Figure 3:
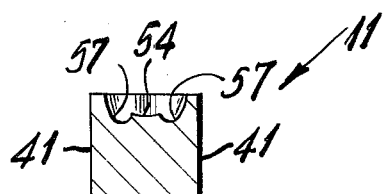
FIG. 3 is a cross-sectional view taken on line 3—3 of FIG. 1.

Referring now in detail to the drawing, T designates a tool comprising a tool holder 10 on which an indexible, disposable cutting insert 11 embodying the invention, is mounted. The tool holder 10 may be of usual construction. It comprises an elongated body 12 of rectangular transverse cross-section. At its front end it has a horizontally extending portion 13 formed with a depressed triangular horizontal surface 15, with a front apex edge 16 at the front end and converging side surfaces 17 meeting at said front edge. At the rear end of said horizontal surface 15 is a vertical surface 18. At the upper end of surface 18 is a horizontal shoulder 19 extending rearwardly and perpendicular to side surfaces 20 of the body 12. The length of surfaces 18 and 19 is equal to the lengths of surfaces 17. Surfaces 17 are at 60° to surface 18. Hence surface 15 is an equiangular triangle in shape. The front end 13 of the body 12 is formed with a vertical hole or bore 24 at the center of the surface 15. The lower end of said bore 24 is formed with an internally threaded or tapped portion 25.

Placed on the surface 15 is a regular triangular shim 30 having a rear edge 31 contacting surface 18 and extending up to a level somewhat higher than the shoulder 19. Said shim has converging side edges 32 substantially in the plane of surfaces 17, and a front apex edge 33.

Said shim 30 has a central hole or opening 34 registering with hole 24.

Mounted on said shim 30 is the cutting insert 11 embodying the invention. Said cutting insert 11 is made of material for cutting steel. The material of which said insert is made could be sintered tungsten carbide, as is well known.

Said insert 11 is triangular in shape and has a horizontal bottom surface 40 and vertical straight side edges 41. The side edges are equal in length and the corners are of 60° extent. One side edge 41 contacts the vertical surface 20. The upper surface 42 of said insert is preferably above the top surface 43 of the body 12. Said insert has a vertical hole or bore 44 registering with hole 34 in the shim 30. The shim 30 and insert 11 may be clamped to the tool holder body 10 by a bolt 45 having a head 46 contacting the top surface 42 of the insert and a shank 47 passing down through openings 44, 34 and 24. The lower end of shank 47 is threaded, as at 48, and screws into the threaded opening 25 of the bore 24. The head 46 may have a wrench socket 49 to receive a hex wrench for tightening or loosening the bolt 45. The insert 11 may be formed at its upper surface 42 with three longitudinal channels 50 alongside the three edges 41 of the insert. Said channels 50 are of transverse curved cross-section. Said channels are longitudinally curved or inclined toward the middle, the ends of the channels being closer to the edges 41 than the centers thereof, thus providing shallow ledges 52 between said channels and said edges 41. Said ledges 52 are widest at the middle between the ends thereof, and narrow towards the ends thereof. The ends of channels 50 merge at the corners of the triangular insert, as at 54. At the corners of the insert, V-shaped depressed grooves 56 are formed at the junctions of channels 50. Each groove 56 has a leg 57, in one end of one channel 50 and another leg 57 in the adjoining end of another channel 50.

The legs 57 of V-shaped grooves 50 are transversely curved and narrower than channels 50, and of less depth than said channels 50 and less than half the length of the channels 50, and are located closer to the ends of ledges 52 than to the inner sides of said channels 50. Said legs are aligned with channels 50 and do not extend beyond the junctions of the channels 50. It will be noted that the surface 42 is substantially triangular in shape, but has inwardly curved side edges 60 at the inner sides of channels 50. The groove legs 57 are close to the outer sides 61 of said channels 50. It will be also noted that the legs 57 at opposite ends of each channel 50 terminate short of each other.

Figure 5:
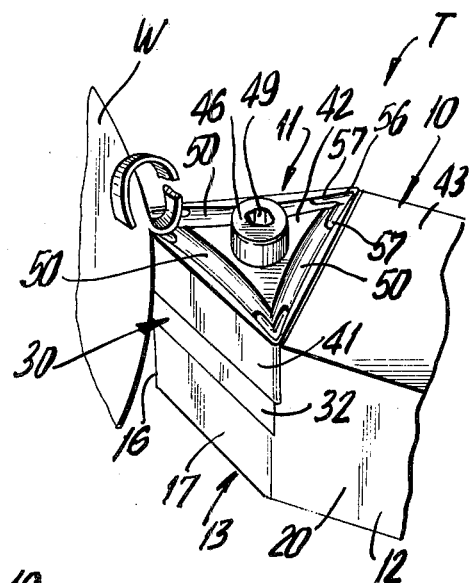
FIG. 5 is a perspective view illustrating a lathe operation with a tool holder on which a cutting insert embodying the invention is mounted.

FIG. 5 illustrates the cutting of a work piece W with a tool T comprising a tool holder 10 and an insert 11 embodying the invention, together with shim 30 and bolt 45.

The angle of the insert to the work piece can be varied. The work piece can be rotatably mounted on a lathe. When a shallow cut is made, the ends only, of the insert cuts the work piece, so that the chip is curled by a leg 57 of a V groove 56 of the insert, and has good chip control to break the chipping. Also, when the longitudinal feed of the tool relative to the work piece is a fine feed (of about between 0.008 inch and 0.016 inch per revolution of the work piece), the V grooves 56 amply control breaking of the chips.

When the cut is deeper than the length of the legs 57 of the V grooves 56, or when the feed of the tool relative to the work piece is greater than 0.016 inch per revolution of the work piece (0.016 inch to 0.040 inch), the tool is set to cut to a depth greater than the length of the legs of 57 of the V grooves 56.

It will be understood that well known means (not shown) can be provided for moving the tool longitudinally of the work piece W and for adjusting movement of the tool axially relative to the axis of the work piece, to vary the depth of the cut.

It is also well known to profile cut or shape an axially rotating work piece $W^1$ (FIG. 4) on a lathe by automatically controlling the longitudinal movement of the holder 10, as well as the movement of the holder axially toward and away from the axis of the work piece $W^1$. By using the insert 11 embodying the invention, the chips will be broken by a portion of the insert near the legs 57 of the V groove 56, when the cuts are shallow (less than length of said legs) and also by portions of said insert near said channels 50 when the depth of the cuts increases. Thus good chip control is achieved both for the shallow as well as the deeper cuts as illustrated in FIG. 4.

Figure 4:
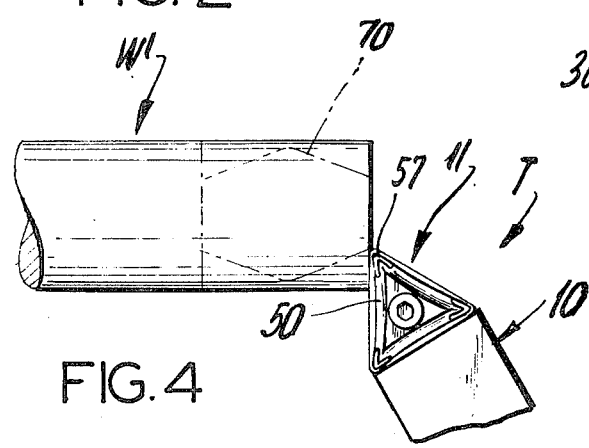
FIG. 4 is a top plan view showing a tool holder on which a cutting insert embodying the invention is mounted in position for a profiling lathe operation on a work piece.

In said FIG. 4, the tool, at its inception is shown positioned for a deeper cut. The dotted line 70 shows the ultimate shape of the cut portion of the work piece $W^1$ after the profiling operation. The tool is moved longitudinally as well as axially of the work piece $W^1$ by well known controls. It will be seen that the depth of the cut decreases to a depth less than the length of leg 57, and then increases to a depth greater than the length of a leg 57. Yet the chip control remains good throughout the profiling operation.

Although the insert 11 is shown triangular, it can have other polygonal shapes. Although the underside of insert 11 is shown smooth, said insert can have the same grooving at opposite faces thereto.

It will thus be seen that there is provided a device in which the several objects of this invention are achieved and which is well adapted to meet the conditions of practical use.

As various possible embodiments might be made of the above invention, and as various changes might be made in the embodiment above set forth, it is to be understood that all matter herein set forth or shown in the accompanying drawings is to be interpreted as illustrative.

I claim:

1. A cutting insert comprising a polygonal shaped piece of material for machine cutting of steel, having straight side edges meeting at the corners of said piece, said piece having a surface formed with longitudinal channels alongside said side edges, said channels merging at the corners of said piece, and said piece being formed with V-shaped grooves depressed into said channels at the corners of said piece, each V-shaped groove having legs aligned with two adjoining ends of adjacent channels, respectively, said legs merging at the apeces of said piece.

2. The combination of claim 1, said channels being deeper than said grooves.

3. The combination of claim 2, said legs being of less than half the length of said channels.

4. The combination of claim 3, said channels and grooves being of downwardly curved transverse cross-section.

5. The combination of claim 4, said legs being closer to the outer sides of said channels than to the inner sides thereof.

6. The combination of claim 5, said channels being longitudinally inclined inwardly from the outer ends thereof toward the middle thereof.

7. The combination of claim 1, said insert having a center hole.

8. The conbination of claim 1, said V shaped grooves being wholly located at the junctions of said channels and terminating short of portions of said channels between said junctions.

* * * * *